(12) United States Patent
Paul

(10) Patent No.: US 7,357,612 B1
(45) Date of Patent: Apr. 15, 2008

(54) STRAP MASTER

(76) Inventor: Walter C. Paul, P.O. Box 2173, Huntersville, NC (US) 28070

( * ) Notice: Subject to any disclaimer, the term of this patent is extended or adjusted under 35 U.S.C. 154(b) by 0 days.

(21) Appl. No.: 11/716,924

(22) Filed: Mar. 12, 2007

(51) Int. Cl.
*B60P 7/00* (2006.01)

(52) U.S. Cl. ............... 410/156; 410/100; 410/103; 279/144

(58) Field of Classification Search ......... 410/100, 410/103, 156, 12, 96; 254/223, 213, 323; 242/390, 532, 129.3; 279/143–145; 81/28, 81/436, 437, 439, 461
See application file for complete search history.

(56) References Cited

U.S. PATENT DOCUMENTS

| | | | |
|---|---|---|---|
| D295,949 S | 5/1988 | Ferrell | |
| 5,607,143 A | 3/1997 | Regal | |
| 5,961,061 A | 10/1999 | Stanley | |
| 6,179,534 B1 | 1/2001 | Weckter | |
| 6,467,755 B2 | 10/2002 | Reilly et al. | |
| 7,278,808 B1 * | 10/2007 | Sisk et al. | 410/156 |
| 2004/0007701 A1 | 1/2004 | Goulet | |

* cited by examiner

*Primary Examiner*—Stephen Gordon

(57) ABSTRACT

The invention is a strap rolling device that provides the end user with the capability of winding long cargo straps either manually or with an electric drill. An end of the tool has a shape that accommodates the chucks of most electric drills. Should no electric drill be available, the end user can manually crank the winch and wind up the long cargo straps with the handle, which is integrated into the body of the tool.

2 Claims, 2 Drawing Sheets

STRAP MASTER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of winding tools for long cargo straps used on flatbed trailers and trucks.

A typical flat bed trailer can have a plurality of long cargo straps used for securing the cargo to the floor of the trailer bed. These cargo straps are wound up and tightened about a winch. Due to the large lengths of the cargo straps, the time taking task of winding and unwinding cargo straps from the winches can be very tedious and burdensome. As such, there is a need for a tool that quickly winds and unwinds cargo straps, that is both lightweight and portable, and can be operated manually or by an electric drill.

B. Discussion of the Prior Art

The Goulet Patent Application Publication (U.S. Pub. No. 2004/0007701) discloses a strap winding device which may be wound using an electronic device, such as a drill. However, the invention in this patent utilizes a winding device that is encapsulated in a large housing, as opposed to a hand-held tool that connects to the chuck of an electric drill.

The Reilly et al. patent (U.S. Pat. No. 6,467,755) discloses a power driven tool for winding a strap or other flexible component onto a winch. However, the tool under this patent does not provide a handle to which the end user may manually turn the device, which would be of interest if no electric drill was available.

The Weckter patent (U.S. Pat. No. 6,179,534) discloses a manually operated strap roller device for rolling up cargo straps. However, the invention under this patent requires the tool to be permanently attached to a surface adjacent to a winch thus requiring multiple devices for each winch located on a flatbed. Furthermore, the device under this patent is manually operated, thus limiting the efficiency created by enabling the device to be operated by an electric drill that can operate at higher rotational velocities.

The Stanley patent (U.S. Pat. No. 5,961,061) discloses a manually operated strap rolling device. The device in this patent is manual, and thus limits the efficiency and ease of operation associated with a tool that is engageable by an electric drill.

The Regal patent (U.S. Pat. No. 5,607,143) discloses a strap rolling device with both a hand powered tightening means and powered tightening means. However, the field of use under this invention is directed to tree stands, and not long cargo straps located on winches of flat bed trailers. Furthermore, the strap rolling device has a large and bulky housing that requires a plurality of straps to be wrapped around a tree for stability during use.

The Ferrell patent (U.S. Pat. No. Des. 295,949) illustrates a design for a manual strap winder.

In light of the above discussed prior art there is a need for a winding tool that can be turned by both hand or by a drill, which can quickly wind and/or unwind long cargo straps that are used on flatbed trailers and trucks.

BRIEF SUMMARY OF THE INVENTION

The invention is a strap rolling device that provides the end user with the capability of winding long cargo straps either manually or with an electric drill. An end of the tool has a shape that accommodates the chucks of most electric drills. Should no electric drill be available, the end user can manually crank the winch and wind up the long cargo straps with the handle, which is integrated into the body of the tool.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
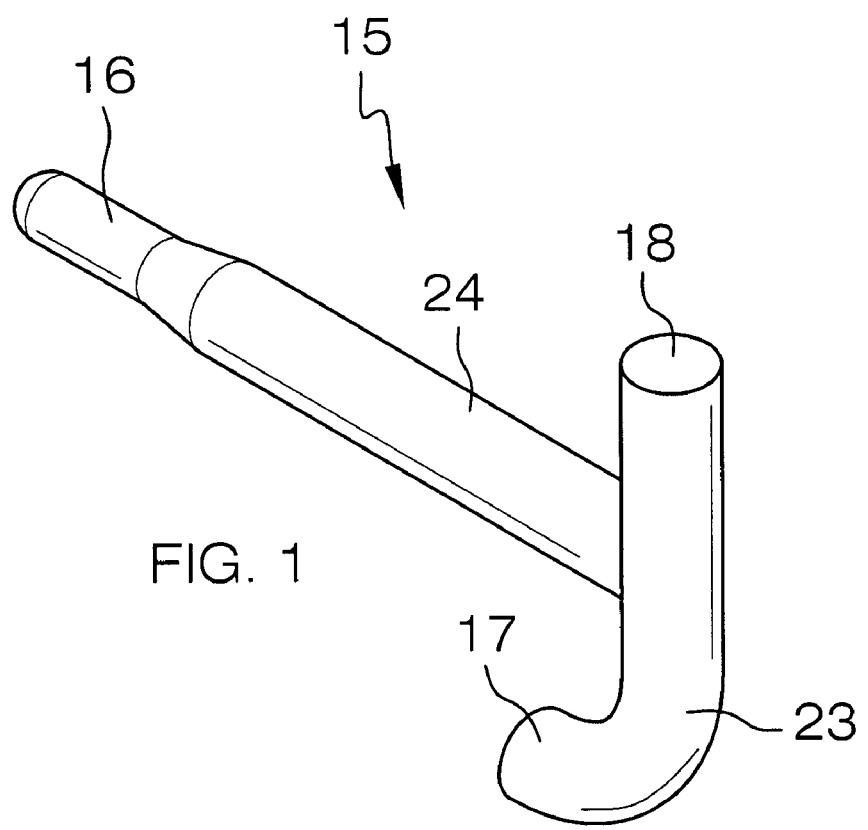
FIG. 1 illustrates an isometric view of the invention.
Figure 2:
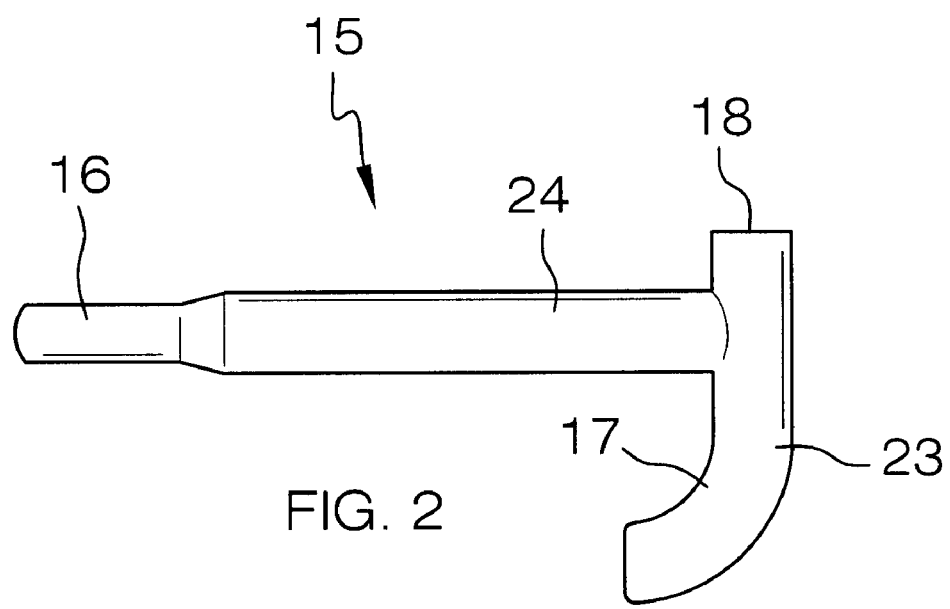
FIG. 2 illustrates a side view of the invention.
Figure 3:
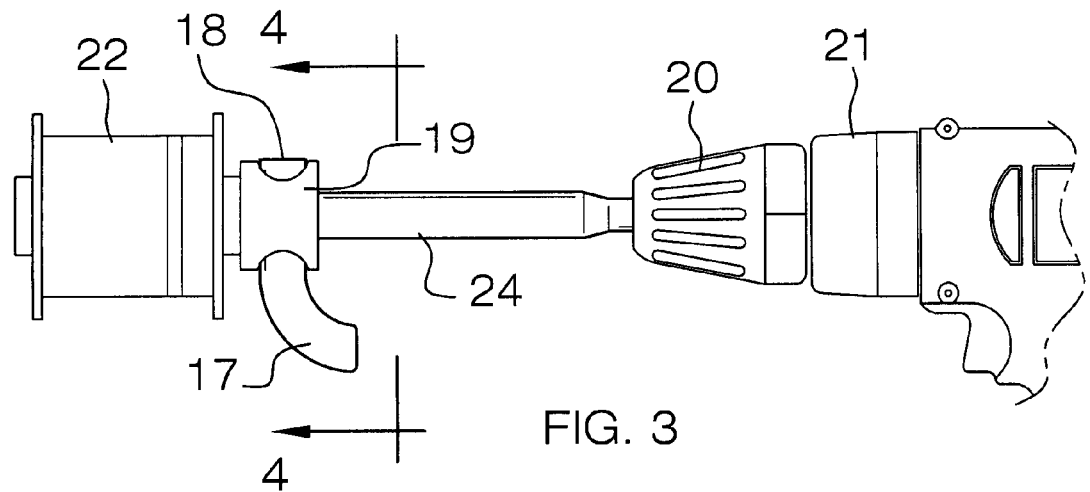
FIG. 3 illustrates a side view of the invention in use with an electric drill.
Figure 4:
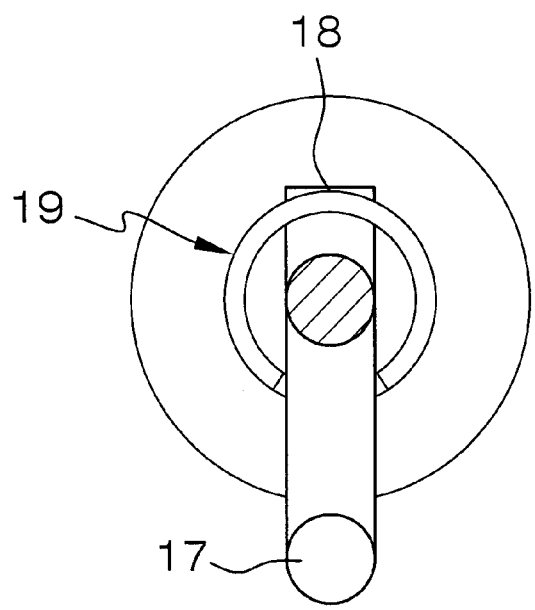
FIG. 4 illustrates a cross-sectional view of the invention along line 4-4.

Detailed reference will now be made to the preferred embodiment of the present invention, examples of which are illustrated in FIGS. 1-4. A tool 15 resembles a T-shaped piece of metal that has a tapered end 16. The top of the tool 15 is adorned with a curved piece 17, which forms a handle 23, and a short end 18 that engages a chuck winch 19.

The tool 15 is used by inserting the short end 18 into the chuck winch 19. The tapered end 16 of the tool 15 is connected to a chuck 20 of an electric drill 21. As the electric drill 21 rotates the chuck 20, the tool 15 rotates, turning the chuck winch 19, and winding up a cargo strap 22.

Should no electric drill 21 be available, the handle 23 provides the end user with the ability to manually drive the chuck winch 19.

The field of winches is well known, such that no discussion of the inner workings of a winch be required.

Once the cargo strap 22 is tight, the tool 15 can be removed from the chuck winch 19, and the tapered end 16 disengaged from the chuck 20 of the electric drill 21.

It shall be further asserted that the tool 15 can be used to both unwind the long cargo strap 22 as well as to wind up the long cargo strap 22.

A main body 24 as well as the tapered end 16 of the tool 15 can be made from round stock, square stock, hexagonal stock, and/or be of hollow shape. In a preferred arrangement, both the main body 24 and tapered end 16 be made from the same piece of metal, but simply machined to the desired dimensions.

The tool 15 may be made of a strong metal comprising tool grade steel, stainless steel, aluminum, or other anti-oxidant metal alloy.

The invention claimed is:

1. A winding device comprising:

(a) a main body;

wherein at one end of said main body is a tapered end that is used to be engaged by an electric drill, pneumatic drill, or other powered drill;

wherein both the main body and the tapered end are made from the same piece of metal, but are machined to desired dimensions;

wherein the main body and the tapered end are made of tubular stock, square stock, hexagonal stock, or other geometric stock;

(b) a T-body;

wherein a predetermined outer surface of the T-body is permanently engaged by an opposing end of the tapered end of the main body;

wherein at one end of the T-body is a short end that does not extend far from a point at which the T-body connects to the main body;

wherein at an opposing end of the T-body is a curve that extends to create a handle for manual turning of the device;

the device is fabricated to include a fastening means connecting the T-body to the main body by welding, or wherein the entire device is be made from casting, or wherein the entire device is made from other methods of fabrication;

wherein in use the short end is introduced to a chuck of a winch, and the opposing end of the T-body is rotated down to interact with an opposite side of the winch, thereafter, a chuck of a powered drill is fastened to the tapered end, thereafter, the fastened drill is powered, which turns the device, and turns the chuck of the winch, winding or unwinding a long cargo strap to a desired point; and wherein should no powered drill be available, the device may be inserted into a chuck of a winch, and the handle be used to manually turn the device to wind or unwind the cargo strap to a desired position.

2. The winding device of claim 1 wherein the T-body and main body are made from a material comprising a tool-grade steel, stainless steel, aluminum, or other anti-oxidizing alloy metal.

* * * * *